(12) United States Patent
Hovey

(10) Patent No.: US 7,881,251 B2
(45) Date of Patent: Feb. 1, 2011

(54) LIGHTWEIGHT PROTOCOL FOR USE IN A TCP/IP COMMUNICATIONS NETWORK

(75) Inventor: Matthew N. Hovey, Royal Oak, MI (US)

(73) Assignee: General Motors LLC, Detroit, MI (US)

(*) Notice: Subject to any disclaimer, the term of this patent is extended or adjusted under 35 U.S.C. 154(b) by 849 days.

(21) Appl. No.: 11/465,614

(22) Filed: Aug. 18, 2006

(65) Prior Publication Data
US 2008/0043684 A1 Feb. 21, 2008

(51) Int. Cl.
H04W 4/00 (2009.01)
H04J 3/16 (2006.01)
(52) U.S. Cl. .................. 370/328; 370/338; 370/469
(58) Field of Classification Search .......... 370/338
See application file for complete search history.

(56) References Cited
U.S. PATENT DOCUMENTS

| | | | | |
|---|---|---|---|---|
| 5,732,074 | A * | 3/1998 | Spaur et al. | 370/313 |
| 6,625,141 | B1 * | 9/2003 | Glitho et al. | 370/352 |
| 6,965,614 | B1 * | 11/2005 | Osterhout et al. | 370/466 |
| 2003/0088421 | A1 * | 5/2003 | Maes et al. | 704/270.1 |
| 2004/0078349 | A1 * | 4/2004 | Syrjala et al. | 705/412 |
| 2004/0243944 | A1 * | 12/2004 | Sabiers et al. | 715/853 |
| 2005/0071423 | A1 * | 3/2005 | Rajaniemi | 709/203 |
| 2005/0080930 | A1 * | 4/2005 | Joseph | 709/248 |
| 2006/0031433 | A1 * | 2/2006 | Patrick et al. | 709/220 |
| 2006/0041431 | A1 * | 2/2006 | Maes | 704/270.1 |
| 2006/0203979 | A1 * | 9/2006 | Jennings | 379/88.17 |
| 2006/0217885 | A1 * | 9/2006 | Crady et al. | 701/213 |
| 2006/0239251 | A1 * | 10/2006 | Bennett et al. | 370/352 |

FOREIGN PATENT DOCUMENTS

CN 1357190 A 7/2002

OTHER PUBLICATIONS

Chinese Office action dated Apr. 7, 2010, for Chinese Patent application No. 20070142652.9, 5 pages.

* cited by examiner

*Primary Examiner*—Melanie Jagannathan
(74) *Attorney, Agent, or Firm*—Anthony Luke Simon; Reising Ethington P.C.

(57) ABSTRACT

A lightweight communications protocol optimized for wireless transfer of data across a TCP/IP network that connects a vehicle communications device to a remote entity, such as a call center. The lightweight protocol utilizes messages that include header, trailer, and payload elements, where the payload element is optimized for the transmission of SOAP content as a default content type, but is capable of transmitting other types of non-SOAP MIME content as well. The lightweight protocol also reduces session overhead and thus data traffic by maintaining sessions in an open status so that numerous messages can be transferred within a single session, without having to shut the session down and rebuild it each time.

17 Claims, 3 Drawing Sheets

US 7,881,251 B2

LIGHTWEIGHT PROTOCOL FOR USE IN A TCP/IP COMMUNICATIONS NETWORK

TECHNICAL FIELD

The present invention generally relates to transferring information across a communications system and, more particularly, to transferring electronic information across a communications system that is configured with a TCP/IP protocol suite. One example of such a communications system includes a vehicle communications device, a wireless carrier, and a remote entity.

BACKGROUND

Many devices and computer-based services today rely upon communication systems to transfer necessary information between one another. The communication systems, in turn, are comprised of numerous independent communication networks, including wireline and wireless networks, all of which need to cooperate with one another in order to form a large, interconnected, ubiquitous communication system.

For example, the Internet, as well as most commercial networks, are configured according to a TCP/IP architectural model that utilizes a TCP/IP protocol suite. The TCP/IP protocol suite is oftentimes thought of as a collection of layers, each of which is responsible for a certain well-defined set of responsibilities so that together the suite of protocols acts as a whole. According to one embodiment, the TCP/IP protocol suite includes an application layer, a transport layer using a Transmission Control Protocol (TCP), an Internet layer using an Internet Protocol (IP), a network layer, and a physical layer.

Another example of a protocol suite is the OSI model, which was established after the TCP/IP protocol suite and differs from that suite in several respects. For instance, the OSI model includes seven layers (Application, Presentation, Session, Transport, Network, Data Link, and Physical layers), where the TCP/IP protocol suite only includes five layers. When making comparisons between the two protocol suites, sometimes the Presentation and Session layers of the OSI model are included within the Application layer so that they form a single combined layer.

It should be appreciated that while the TCP/IP and OSI protocol suites mentioned above make up a large portion of the communications systems currently in use, additional protocol suites, such as proprietary protocol suites, can also be used to configure a communications system.

SUMMARY OF THE INVENTION

According to one aspect of the invention, there is provided a communications system for providing wireless communication between a vehicle and one or more remote entities. The communications system comprises a vehicle communications device, a remote entity, and a wireless carrier system. The vehicle communications device, the remote entity, and the wireless carrier system communicate over a network configured with a TCP/IP protocol stack having a data link layer, a network layer, a transport layer, and an application layer. The application layer includes a first sub-layer utilizing a SOAP protocol, a second sub-layer utilizing a MIME protocol, and a third sub-layer utilizing a lightweight protocol.

According to another aspect of the invention, there is provided a method for communicating with a vehicle communications device over a wireless network. The method comprises the steps of: (a) establishing a session between an initiator peer and a listener peer, wherein the session is established over a wireless network configured with a TCP/IP protocol stack having an application layer that includes a first sub-layer utilizing a SOAP protocol, a second sub-layer utilizing a MIME protocol, and a third sub-layer utilizing a lightweight protocol, (b) sending a request message from the initiator peer to the listener peer, (c) sending a response message from the listener peer to the initiator peer, and (d) closing the session.

According to yet another aspect of the invention, there is provided a communications system for providing wireless communication between a vehicle and one or more remote entities. The system comprises a vehicle communications device, a remote entity, and a wireless carrier system. The vehicle communications device, the remote entity, and the wireless carrier system communicate over a network configured with a TCP/IP protocol stack having a data link layer utilizing a CDMA protocol, a network layer utilizing an IP protocol, a transport layer utilizing a TCP protocol, and an application layer, where the application layer includes a first sub-layer utilizing a SOAP protocol, a second sub-layer utilizing a MIME protocol, and a third sub-layer utilizing a lightweight protocol. The lightweight protocol provides for messages comprising a header element containing a size indicator, a trailer element indicating the end of the message, and a payload element. The payload element is optimized for SOAP content as a default content type, but can provide for other arbitrary, non-SOAP MIME content by including entity-headers.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The lightweight protocol disclosed herein is a communications protocol preferably used in conjunction with a communications system that is configured with a TCP/IP protocol suite and provides wireless communication between a vehicle communications device and a remote entity, such as a call center.

Figure 1:
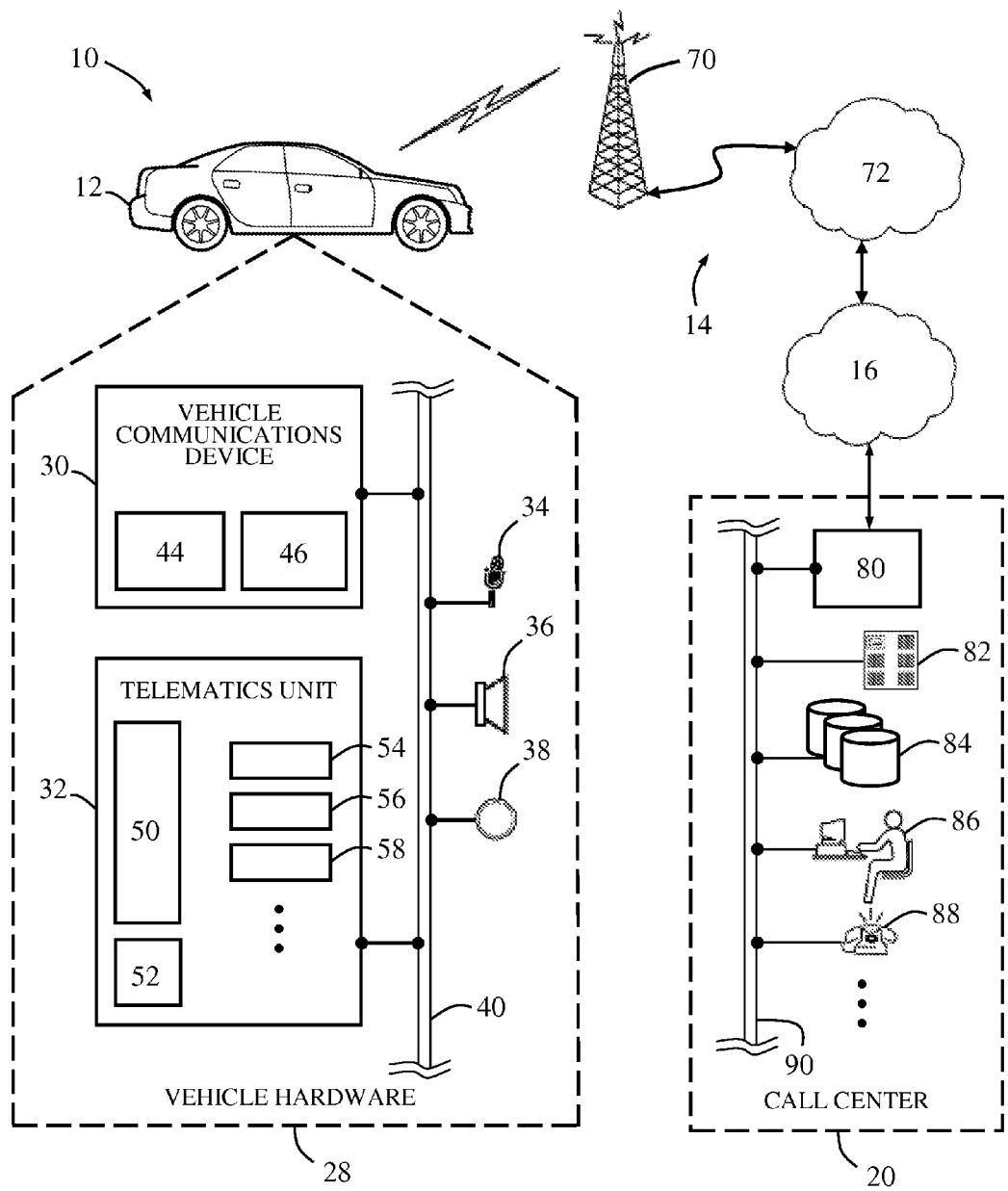
FIG. 1 is a block diagram depicting an exemplary embodiment of a communications system that is capable of utilizing a TCP/IP protocol suite.

FIG. 1 shows an example of a communication system 10 that may use the lightweight protocol and generally includes a vehicle 12, a wireless carrier system 14, a land network 16, and a call center 20. It should be appreciated that the overall architecture, setup and operation, as well as the individual components, of a system such as that shown here are generally known in the art. Thus, the following paragraphs simply provide a brief overview of one such exemplary communication system 10, however, other systems not shown here could employ the lightweight protocol as well.

Vehicle 12 is preferably a mobile vehicle such as a motorcycle, car, truck, recreational vehicle (RV), boat, plane, etc., and is equipped with suitable hardware and software that enables it to communicate over system 10. Some of the vehicle hardware 28 is shown generally in FIG. 1 and includes a vehicle communication device 30, a telematics unit 32, a microphone 34, a speaker 36 and buttons and/or controls 38 that are interconnected using a network connection or bus 40. Examples of suitable network connections include a controller area network (CAN), a media oriented system transfer (MOST), a local interconnection network (LIN), an ethernet, and other appropriate connections such as those that conform with known ISO, SAE and IEEE standards and specifications, to name but a few.

Vehicle communication device 30 preferably uses radio transmissions to establish a voice channel with wireless carrier system 14 so that both voice and data transmissions can be sent and received over the voice channel. By providing both voice and data communication, vehicle communication device 30 enables the vehicle to offer a number of different services including those related to navigation, telephony, emergency assistance, diagnostics, infotainment, etc. According to one embodiment, vehicle communication device 30 includes a standard cellular chipset 44 for voice communications like hands-free calling, and a modem 46 for data transmission. In order to enable successful data transmission over the voice channel, modem 46 applies some type of encoding or modulation to convert the digital data so that it can communicate through a vocoder or speech codec incorporated in chipset 44. Any suitable encoding or modulation technique that provides an acceptable data rate and bit error rate can be used with the disclosed method.

The telematics unit 32 is an onboard device that provides a variety of services through its communication with call center 20, and generally includes an electronic processing device 50, one or more types of electronic memory 52 and a number of function-specific devices or modules 54-58. The telematics unit 32 provides a variety of different services including, for example: turn-by-turn directions and other navigation-related services provided in conjunction with a GPS-based vehicle navigation unit 54; airbag deployment notification and other emergency or roadside assistance-related services provided in connection with various sensors 56 located throughout the vehicle; and infotainment-related services where music, webpages, movies, television programs, videogames and/or other information is downloaded by an infotainment center 58 and stored for current or later playback. The above-listed services are by no means an exhaustive list of all of the capabilities of telematics unit 32, as should be appreciated by those skilled in the art, but are simply an illustration of some of the services that the telematics unit is capable of offering. It is anticipated that telematics unit 32 will include a number of known components in addition to those listed above. The construction and operation of a suitable vehicle mounted telematics unit that can provide the above-identified services is known to those skilled in the art.

Wireless carrier system 14 is preferably a cellular telephone system or any other suitable wireless system that transmits signals between the vehicle hardware 28 and land network 16. According to an exemplary embodiment, wireless carrier system 14 includes one or more cell towers 70, base stations and/or mobile switching centers (MSCs) 72, as well as any other networking components required to connect the wireless system 14 with land network 16. As is appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements. Preferably, a speech codec or vocoder is incorporated in one or more of the base stations, but depending on the particular architecture of the wireless network, it could be incorporated within the MSC or some other network component as well.

Land network 16 can be a conventional land-based telecommunications network that is connected to one or more landline telephones and connects wireless carrier network 14 to call center 20. For example, land network 16 can include a public switched telephone network (PSTN) and/or a network configured with a TCP/IP protocol suite, as is appreciated by those skilled in the art. Of course, one or more segments of land network 16 could be implemented through the use of a standard wired network, a fiber or other optical network, a cable network, power lines, other wireless networks such as wireless local area networks (WLANs) or networks providing broadband wireless access (BWA), or any combination thereof. Furthermore, call center 20 need not be connected via land network 16, but could include wireless telephony equipment so that it can communicate directly with wireless network 14.

Call center 20 is designed to provide the vehicle hardware 28 with a number of different system back-end functions and, according to the exemplary embodiment shown here, generally includes one or more switches 80, servers 82, databases 84, live advisors 86, as well as a variety of other telecommunication and computer equipment 88 that is known in the art. These various call center components are preferably coupled to one another via a wired or wireless local area network 90. Switch 80, which can be a private branch exchange (PBX) switch, routes incoming signals so that voice transmissions are usually sent to either the live adviser 86 or an automated response system, and data transmissions are passed on to a modem or other piece of equipment 88 for demodulation and further signal processing. The modem preferably includes an encoder, as previously explained, and can be connected to various devices such as a server 82 and database 84. Database 84 could be designed to store subscriber profile records, subscriber behavioral patterns, or any other pertinent subscriber information. Data transmissions may also be conducted by wireless systems, such as, for example 802.11x, GPRS, and the like. Although the illustrated embodiment has been described as it would be used in conjunction with a manned call center 20, it will be appreciated that the call center can utilize an unmanned automated call response system and, in general, can be any central or remote facility, manned or unmanned, mobile or fixed, to or from which it is desirable to exchange voice and data transmissions.

Figure 2:
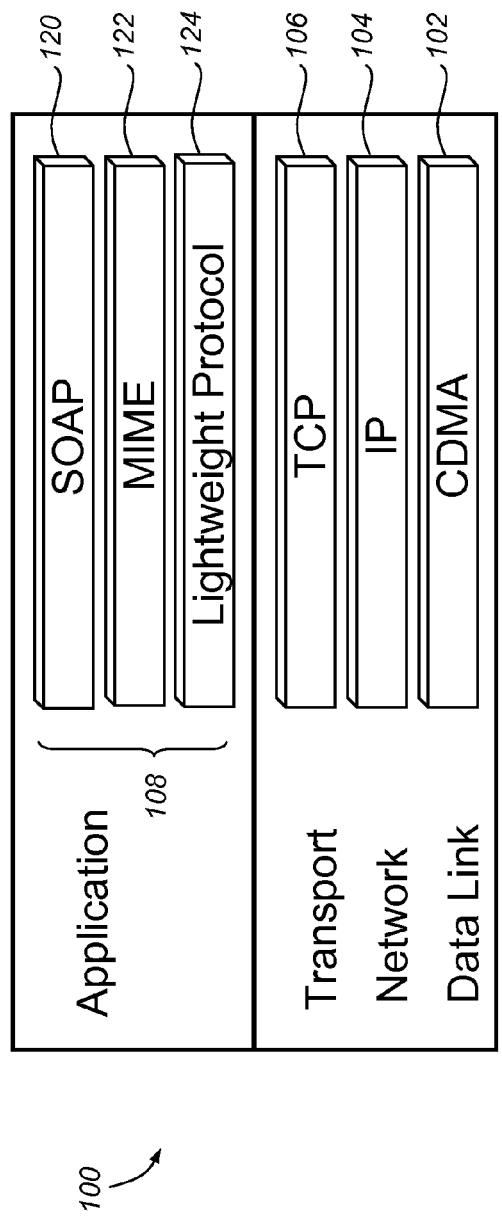
FIG. 2 is a block diagram depicting multiple layers of an exemplary TCP/IP protocol suite, including an Application Layer sub-layer that uses the lightweight protocol disclosed herein.

Turning now to FIG. 2, there is shown a block diagram of an exemplary embodiment of an internet protocol suite 100 (also referred to as the 'TCP/IP stack') which is generally comprised of four separate layers and includes the basic set of communications protocols on which the Internet and most commercial networks run. Each of the layers is designed to perform a certain set of tasks or solve a particular set of problems relating to data transmission, and only interacts with the layers immediately below and immediately above it. Accordingly, each layer in TCP/IP stack 100 performs services for the adjacent layer above it and makes requests of the adjacent layer below it. The upper layers in the TCP/IP stack 100 are generally closer to the end user and deal with more abstract data, while those layers lower in the stack are generally closer to the hardware and pertain more to issues dealing with actual data transmission.

TCP/IP stack 100 preferably includes a data link layer 102, a network layer 104, a transport layer 106, and an application layer 108, but can have one of any number of different protocol layer combinations known in the art. According to a preferred embodiment, TCP/IP stack 100 uses a CDMA or other radio protocol for data link layer 102, an IP protocol for network layer 104, and a TCP protocol for transport layer 106. It should be understood, however, that the lightweight protocol disclosed herein is not limited to use in the application layer 108 of the exemplary internet protocol suite 100 and can be used in any appropriate protocol suite, including a TCP/IP stack other than that shown here, a seven-layer OSI model, or some other wireless or wireline protocol suite. Because various embodiments of layers 102-106 are already known in the art, the following description focuses on the Application Layer 108, which includes several sub-layers including one that utilizes the lightweight protocol.

Application layer 108 generally coordinates the communications and manages the dialog between two peers, and is somewhat analogous to the combination of the application, presentation, and session layers of a seven-layer OSI model. If data is to be transmitted through a network configured with TCP/IP stack 100, then application layer 108 encapsulates the data in a transport layer protocol before passing it along to the transport layer 106. According to the embodiment shown here, application layer 108 generally includes first, second and third sub-layers 120, 122, 124, where the third sub-layer 124 utilizes the lightweight protocol.

Beginning with sub-layer 120, this sub-layer is closest to the end user, and is sometimes referred to as the envelope sub-layer because it further defines the format of the data by defining the format of its envelope. One example of a suitable envelope sub-layer protocol is Simple Object Access Protocol (SOAP). As will be appreciated by those skilled in the art, SOAP is a protocol that is generally used to exchange XML-based messages over a network, and forms a basic messaging foundation that can be used within a Web Service Protocol stack (not shown). There are several different types of messaging patterns in SOAP, however, the most common of those is the Remote Procedure Call (RPC) pattern. An RPC pattern uses a first network node (referred to as a SOAP sender) to send a request message to a second network node (referred to as a SOAP receiver), in reply to which the SOAP receiver immediately sends a response message back to the SOAP sender.

Sub-layer 122, also referred to as a content management sub-layer, is generally responsible for defining the data format. For instance, Multipurpose Internet Mail Extension (MIME) is an Internet standard that is commonly used to format emails and can be utilized by content management sub-layer 122. MIME defines mechanisms for sending information by encoding and decoding the information so that non-ASCII text files, such as those containing images, sounds, movies, programs, etc. can be transmitted. A MIME header is added to the file and defines the type of data contained within the file and the encoding method used, as is understood by those skilled in the art.

Turning now to sub-layer 124, the lightweight protocol disclosed herein is especially useful with applications that call for the transmission of arbitrary MIME content, but seek to reduce data traffic by minimizing session and/or protocol overhead. One such application is communications system 10, where a vehicle communications device 30 wirelessly communicates with a remote call center 20, another vehicle, or some other remote entity, and is oftentimes charged a service fee that is based on the data traffic that it uses. The lightweight protocol disclosed herein is streamlined for efficient communication and is specifically designed to operate underneath sub-layers 120 and 122 using SOAP and MIME protocols, respectively, and above network and transport layers using IP and TCP protocols, respectively.

The lightweight protocol is built on the semantics of synchronous request-reply messaging which generally involves sending a request to obtain a reply in return, and requires that each peer be capable of both sending and receiving messages. For purposes of description, the term 'peer' broadly refers to any of the users, processes, programs, devices, controllers, or other logical entities, whether they be executable, embedded or otherwise, that operate on the same protocol level of a layered communications network. The lightweight protocol of the present disclosure defines a method for handling TCP/IP sessions between two or more peers by defining the message flow and the message structure, while at the same time being compatible with IP, TCP, MIME and SOAP protocols. That is, the lightweight protocol uses semantics and syntax that are similar to these other protocols whenever possible, thus making programming and interfacing easier. There are several different types of peers involved with a typical lightweight protocol session: an 'initiator peer' is the peer that establishes a connection once a session is established; a 'listener peer' is the peer that waits for a new connection from the initiator peer once a session is established; a 'client peer' is the peer that starts an exchange once a session is established, and; a 'server peer' is the peer that responds to client peer once a session is established. All of the peers that are connected to communications system 10 and use the lightweight protocol are preferably able to play all of the aforementioned roles in order to facilitate synchronous, bi-directional communication.

Figure 3:
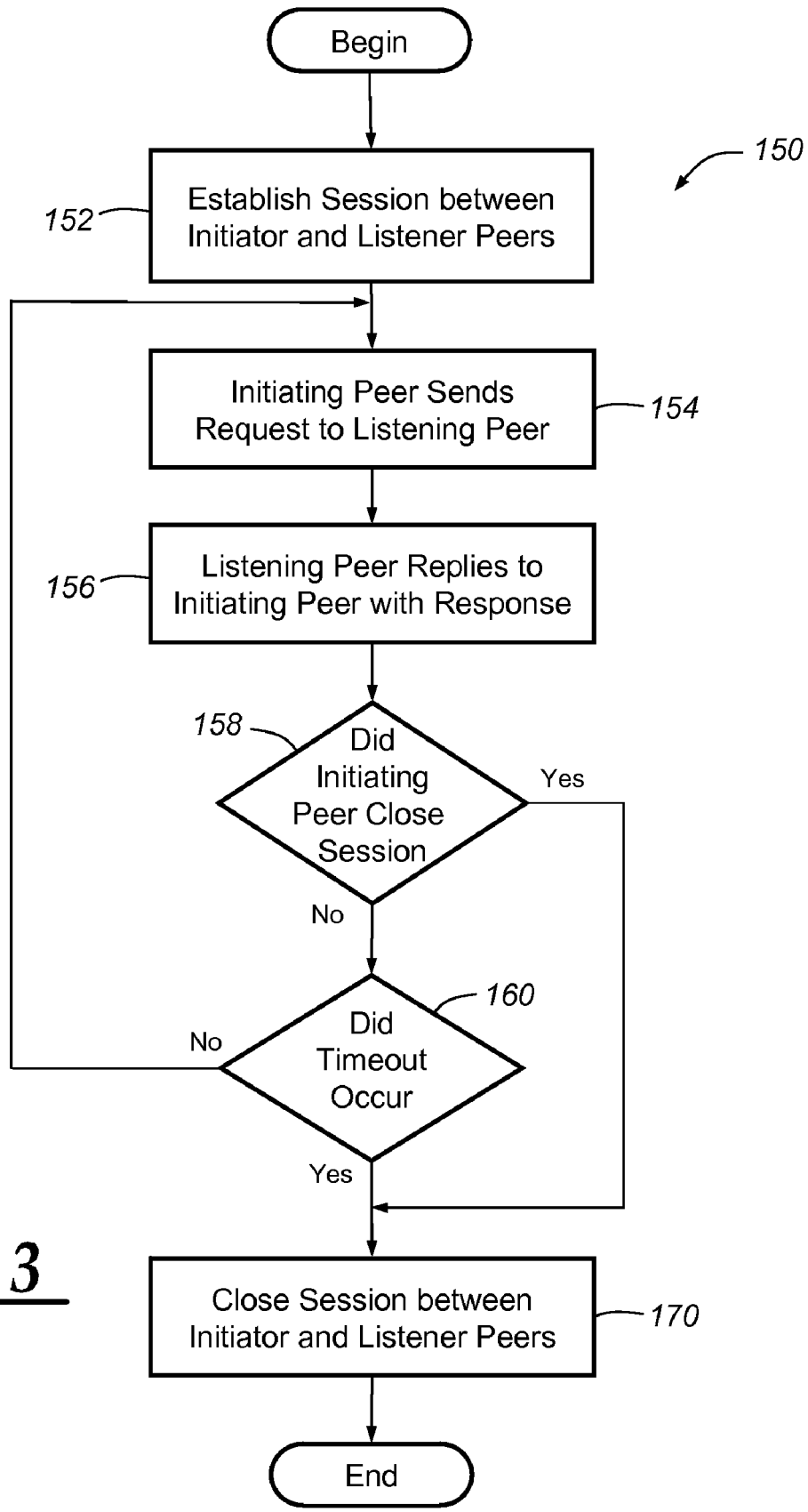
FIG. 3 is a flowchart showing some of the steps of an embodiment of a method for sending and receiving messages according to the lightweight protocol.

As previously mentioned, the lightweight protocol is designed for use in a TCP/IP network in order to establish communication between two or more peers. With reference to FIG. 3, there is shown a flowchart outlining some of the basic steps involved in a method 150 that establishes a lightweight protocol session between an initiator peer and a listener peer. Beginning with step 152, an initiator peer establishes a session with a listener peer by performing a standard TCP 3-way handshake, as set forth in RFC-793. This handshake involves a sequence of messages, including active and passive TCP OPEN calls sent by the initiator and listener peers, respectively. Unlike other application layer protocols involving more session overhead, no further actions are required to start this lightweight protocol session. Once a session has been established, the listener peer is ready to receive messages from the initiator peer. In step 154, the initiator peer sends a request message to the listener peer. In reply to that request message, the listener peer sends a response message back to the initiator peer, step 156. As can be seen, normal messaging that occurs during an established session and involves a single interaction generally includes two messages and is completed when the initiator peer receives the response message from the listener peer.

In order to further minimize data traffic or overhead, lightweight protocol method 150 generally maintains or keeps open a session in between messaging interactions. Put differently, once a lightweight protocol session is established, the initiator and listener peers can send and receive numerous request and response messages, steps 154 and 156, without having to open and close the session each time. Some protocols require that the session be closed down each time a response message is received, and that a new session be rebuilt before sending another request message. The acts associated with repetitively opening and closing sessions can be taxing on the communications system, as they tend to use up various resources. For instance, creating, sending, and receiving control messages that are associated with opening and closing sessions require network bandwidth and processing resources, to name but a few of the ramifications. In many networks, especially wireless networks such as wireless carrier 14, service fees are directly correlated to bandwidth or data traffic. By eliminating these control messages, the lightweight protocol is able to reduce data traffic and, consequently, the operating costs of the network. Furthermore, maintaining the session in an open status frees up the initiator and the listener peers to perform other functions. In general, the request and response messages sent in steps 154 and 156 will continue until one of two events occurs: the initiator peer closes the session, step 158, or an idle session timeout occurs, step 160.

Step 158 inquires as to whether or not the initiator peer has closed the session, as is usually the case once the initiator peer receives a response message from the listener peer, as well as any other information that it is seeking. It should be recognized that until the session is closed, whether it be by an affirmative closure on the part of the initiator peer or an idle session timeout, the listener peer should remain ready to receive additional messages from the initiator. Step 160, on the other hand, determines if a certain amount of time has elapsed (referred to as an idle session timeout), and if so directs control of the method to a step 170 so that the session can be closed. The idle session timeout is the maximum amount of time the listener peer will wait for a request message from the initiator peer before closing the session. According to a preferred embodiment, the elapsed time associated with an idle session timeout is: i) reset by the listener peer each time a request message is received from the initiator peer, ii) continues to run so long as the listener peer is not receiving, processing, or sending messages to or from the initiator, and iii) a predetermined amount of time that is selected for the particular application in which the lightweight protocol is being used.

If steps 158 and 160 both result in 'no', which indicates that neither an affirmative closure of the session by the initiator peer nor an idle session timeout has occurred, then the system returns to step 154 so that additional request messages may be sent by the initiator peer. In this manner, the lightweight protocol provides for the maintenance of the session in an open status so that numerous request and response messages can be transmitted without closing and reestablishing the session each time. Conversely, if either of steps 158 or 160 result in 'yes', then control of the process passes to step 170, which closes the session by executing a standard TCP 4-way handshake. It should be appreciated that the foregoing description of method 150 is simply a general description of the process and does not cover every step or sub-step that takes place. For instance, skilled artisans will appreciate that numerous other steps can and do take place and that various messages, other than those described above, could be sent through communications system 10.

Figure 4:
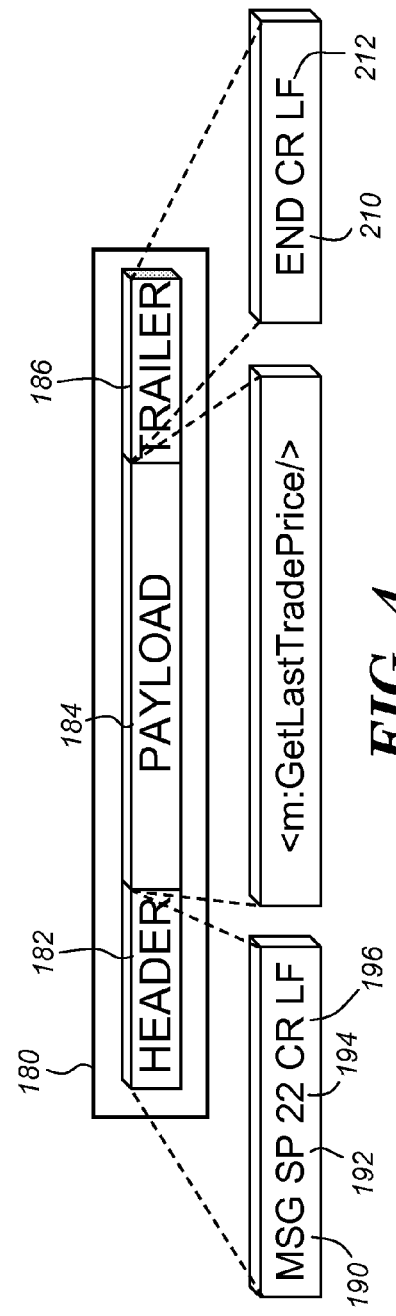
FIG. 4 is a block diagram showing an embodiment of a message structure that conforms to the lightweight protocol.

Turning now to FIG. 4, each message that is sent using the lightweight protocol disclosed herein has a message body 180 that includes a header 182, a payload 184, and a trailer 186, all of which preferably conform with Augmented Backus-Naur Form (ABNF) syntax. The header 182 preferably includes an uppercase three-character directive 190, followed by a single space (SP) 192, a value 194 indicating the size of the payload, and a carriage return, line feed pair (CR LF) 196. The directive informs the listening peer of the message's purpose or it may be an instruction that commands the receiving peer to respond with some type of information. For example, several common directives include MSG, RPY, VER, and ERR, although numerous other directives are possible as well. The MSG directive is used when sending general requests to the listener peer, and the RPY directive is used by the listener when replying to such a request message. The RPY response is the general response message for the lightweight protocol and is usually the only response the initiator peer will receive in reply to an MSG request. The VER directive is used by the initiator to request the versions of the lightweight protocol supported by the listener peer, to which the listener replies with a report of the inclusive range of supported versions of the protocol and specifies the minimum and maximum supported versions. The reported versions are preferably published final versions of the protocol's specification and are versions with which the peer is wholly compliant. The ERR directive indicates that an error has been detected by the listener peer when processing a request from the initiator. Peers are restricted from using the ERR directive to report errors related to the processing or use of payload data. For example, SOAP errors and application processing timeouts must be reported using the standard RPY response directive rather than the ERR directive. It should be appreciated that the lightweight protocol includes extension points that allow directives to be added or deleted from the protocols specification, as is understood by those skilled in the art.

Following directive 190 and space 192, value 194 identifies the payload size by providing the exact number of eight-bit octets contained within the payload; this value preferably does not include the size of header 182 or trailer 186. The payload size may range from 0 to 2147483647 and it may not be a negative integer. By providing the size of the payload 184 in header 182, the recipient of the message is better able to determine if the message has arrived in its entirety. Although the foregoing description of header 182 conforms with ABNF and includes a directive, a space, a payload size value, and a CR LF pair, it should be appreciated that this is only an exemplary embodiment and that the header can vary from this example.

Payload 184 is the next component of message body 180, and contains the primary data or instructions of the message. The lightweight protocol is created with default settings which reduce overhead by obviating some of the control data, and make it more flexible by giving it the ability to send and receive any recognized MIME content. For example, the embodiment shown here includes a payload 184 that is structured with the default protocols for sub-layers 120 and 122; namely, SOAP over MIME. Because this particular embodiment uses the default protocols, and in turn uses the default content type and transfer encoding, certain types of control data like MIME entity headers can be omitted from the message. This, of course, has the effect of reducing the overhead and data traffic being sent over the network. If either the initiating or listening peer receives a message without any entity headers or with insufficient entity headers, then the receiving peer assumes that the message is structured according to the default arrangement. As previously stated, the default content type is defined as "Content-Type" "text/xml; charset=UTF-8" otherwise known as SOAP, and the default content transfer encoding, "Content-Transfer-Encoding" is 8-bit. Use of default arrangements by the lightweight protocol can be advantageous over other protocols that do not have comparable default features. For instance, the lack of a default content type for HTTP messages creates unwanted overhead for devices and services that use a common content type most of the time. Requiring header information in all messages increases the size of messages sent over HTTP and thus uses more resources of the network.

In addition to reducing overhead, the lightweight protocol of the present disclosure is flexible in that it can accommodate most messages having a valid MIME format, including those formatted with a combination other than SOAP over MIME. The lightweight protocol uses header entities, although their inclusion is not necessary as explained above, to send and receive messages structured with one of a variety of valid MIME formats. The entity headers are preferably structured according to the specifications found in RFC 2045, section 3. Examples of some suitable MIME-compatible protocols for sub-layer 120, other than SOAP, include HTTP, SMTP, BEEP, etc., as is appreciated by those skilled in the art.

Trailer 186 follows payload 184 and terminates the message so that the recipient knows that the message is finished. According to the embodiment shown here, trailer 186 includes an END 210 followed by a CR LF pair 212. Because the lightweight protocol is not an octet-stuffing protocol, if the listener peer receives a message having an ASCII equivalent to trailer 186 in the message payload, the listener peer will not treat the message as having been terminated in the payload. Instead, the listener peer will treat the actual trailer 186 as the end of the message. In order to avoid the message being considered 'poorly-formed', the trailer should immediately follow the payload. A poorly formed message causes the listener peer to respond with an error message (Bad Request) to indicate the faulty condition of the message. If more than one condition indicating that a poorly formed messages is encountered, the listener peer preferably reports the first condition encountered. A poorly-formed message exists when any of the following exemplary conditions occur: header 182 starts with an unidentified directive or is syntactically incorrect; the payload size value 194 is missing or is syntactically incorrect; the trailer 186 does not immediately follow the payload 184; or the trailer is missing or syntactically incorrect, to name but a few examples.

To summarize some of the messaging constructs discussed above, the Augmented Backus-Naur form (ABNF) for a standard message using the lightweight protocol in combination with a SOAP over MIME arrangement is as follows:

```
message = header payload trailer
header = directive SP size CR LF
directive = ALPHA ALPHA ALPHA
size = 0. . . 2147483647
payload = *OCTET
trailer = "END" CR LF
```

The lexical tokens used in the ABNF above are based upon RFC-2234 and are summarized as follows:

```
CR = carriage return, ASCII 0x0D
LF = line feed, ASCII 0x0A
CRLF = CR LF
ALPHA = 0x61-0x7A, A-Z
SP = space, ASCII, 0x20
OCTET = 0x00-0xFF
```

There are provided below several examples of messages using the lightweight protocol disclosed herein. The first example shows a message request that is sent by the initiator peer and uses an MSG directive, and a message response that is returned by the listener peer and uses the RPY directive. The ellipses represent processing of the message payload on the listener peer side.

```
Initiating Peer:   MSG 364
                   <SOAP-ENV:Envelope xmlns:SOAP-
                   ENV="http://schemas.xmlsoap.org/soap/envelope/"
                   SOAP-ENV:encodingStyle="http://schemas.xmlsoap.org/
                   soap/encoding/"><SOAP-ENV:Body><m:
                   GetLastTradePrice xmlns:m="Some-
                   URI"><symbol>DIS</
                   symbol></m:GetLastTradePrice></SOAP-
                   ENV:Body></SOAP-ENV:Envelope>
                   END
                   . . .
Listener Peer:     RPY 373
                   <SOAP-ENV:Envelope xmlns:SOAP-
                   ENV="http://schemas.xmlsoap.org/soap/envelope/"
                   SOAP-ENV:encodingStyle="http://schemas.xmlsoap.org/
                   soap/encoding/"><SOAP-ENV:Body><m:
                   GetLastTradePriceResponse xmlns:m="Some-
                   URI"><price>12.88</price></m:
                   GetLastTradePricResponse></SOAP-
                   ENV:Body></SOAP-ENV:Envelope>
                   END
```

In order to illustrate some of the reductions in session overhead that can be experienced by using the lightweight protocol, the previous example is now provided as a message using SOAP over HTTP. The previous messaging example was between an initiator peer and a listener peer; this example is between a client and a server. As will be appreciated by those skilled in the art, use of the lightweight protocol results in an appreciable reduction in data traffic associated with session overhead.

```
Client:   POST /example HTTP/1.1
          Content-type: text/xml; Charset=utf-8
          Content-Length : 364
          SOAPAction: "/example"
          User-Agent: Java/1/4/2_03
          Host: localhost:9090
          <SOAP-ENV:Envelope xmlns:SOAP-ENV="http://schemas.
          xmlsoap.org/soap/envelope/" SOAP-ENV:encodingStyle=
          "http://schemas.xmlsoap.org/soap/encoding/"><SOAP-
          ENV:Body><m:GetLastTradePrice xmlns:m="Some-
          URI"><symbol>DIS</symbol></m:GetLastTradePrice></
          SOAP-ENV:Body></SOAP-ENV:Envelope>
Server:   HTTP/1.1 200 OK
          Connection: close
          Content-Length: 291
          Content-Type: text/xml; charset=utf-8
          Date: Wed, 08 Aug 2006 05:05:04 GMT
          Server: Example HTTP server
          <SOAP-ENV:Envelope xmlns:SOAP-ENV=http://schemas.
          xmlsoap.org/soap/envelope/SOAP-ENV:encodingStyle=
          "http://schemas.xmlsoap.org/soap/encoding/"><SOAP-
          ENV:Body><m:GetLastTradePriceResponse xmlns:m="Some-
          URI"><price>12.88</price></m:GetLastTradePricResponse></
          SOAP-ENV:Body></SOAP-ENV:Envelope>
```

According to next example, the initiating peer uses the "VER" directive to request the protocol versions supported by the listener peer. In response to this request, the listener peer indicates that it supports versions 1 and 2 of the lightweight protocol.

```
Initiating Peer:        VER 0
                        END
```

```
           -continued

Listening Peer:   RPY 27
                  <EMXP-version min=1 max=2/>
                  END
```

According to the following example, the initiating peer sends a request message that includes a payload larger than the payload size value 194 indicates. After detecting the error, the listener peer uses the "ERR" directive in a response message to report the appropriate error code back to the initiating peer.

```
Initiating Peer:  MSG 17
                  <SOAP-ENV:Envelope
                  xmlns:SOAPENV="http://schemas.xmlsoap.org/soap/
                  envelope/"SOAPENV:encodingStyle="http://
                  schemas.xmlsoap.org/soap/encoding/"><SOAP-ENV:
                  Body><m:GetLocation xmlns:m="Some-URI"/></
                  SOAPENV:Body></SOAP-ENV:Envelope>
                  END
                  ...
Listening Peer:   ERR 47
                  <EMXP-err code="400">Trailer missing or bad message
                  length</EMXP-err>
                  END
```

The lightweight protocol is designed to use error codes similar to those found in widely-used internet protocols such as HTTP or BEEP. The use of common error codes makes it easier for developers familiar with other common protocols to learn and begin using the lightweight protocol disclosed herein. According to a preferred embodiment, the error codes are integers in the range of 100-999, inclusive, and are grouped into sub-ranges of 100 codes each. Sub-ranges are assigned a particular category of error codes. For example, errors that appear to originate from the initiating peer are assigned to the 4xx sub-range, and include the following common examples: 400 Bad Request, 403 Forbidden, 413 Message Too Large, and 415 Unsupported Media Type. Errors that appear to originate from the listening peer are similarly assigned to the 5xx sub-range. Some common examples of these listener-originated errors include: 500 Internal Server Error, 501 Not Implemented, and 503 Service Not Available, to name but a few. Those skilled in the art will be familiar with these and other error codes from various commonly used protocols.

Security can be provided with the lightweight protocol to ensure confidentiality, data integrity, and availability. Encryption can be used to prevent unauthorized viewing of data sent through the lightweight protocol. One example of encryption use is to use the protocol over IP-SEC or TLS/SL with a strong cipher. Moreover, the payload 184 of the message may be encrypted. The lightweight protocol's ability to transfer arbitrary data enables the payload to be encrypted and transmitted within the MIME envelope with the "application/octet-stream" Content-Type and "binary" Content-Transfer-Encoding, or by using S/MIME or some other technique. Additionally, the ability to transfer SOAP messages enables the body of the SOAP messages to be encrypted with or without the use of WS-Security. Another method of protection is to use more traditional models of challenge-response implemented in the layers above or below the lightweight protocol. Checksums and byte-counts help ensure that all data is received by the listener. To protect against man-in-the-middle attacks, the use of TLS with a strong cipher may be used as well.

It is to be understood that the foregoing description is not a definition of the invention, but is a description of one or more preferred exemplary embodiments of the invention. The invention is not limited to the particular embodiment(s) disclosed herein, but rather is defined solely by the claims below. For instance, the lightweight protocol can be used with a variety of protocol suites and is not specifically limited to the particular TCP/IP stack 100 shown in FIG. 2. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A communications system for providing wireless communication between a vehicle and one or more remote entities, comprising:
   a vehicle communications device located on the vehicle;
   a remote entity located some distance from the vehicle; and
   a wireless carrier system that communicates with both said vehicle communications device and said remote entity so that information can be wirelessly exchanged therebetween;
   wherein said vehicle communications device, said remote entity, and said wireless carrier system communicate over a network configured with a TCP/IP protocol stack having a data link layer, a network layer, a transport layer, and an application layer, said application layer includes a first sub-layer utilizing a SOAP protocol, a second sub-layer utilizing a MIME protocol, and a third sub-layer utilizing a non-HTTP lightweight protocol that maintains an established session in an open status while a plurality of request and response messages are transmitted between said vehicle communications device and said remote entity without closing said established session down.

2. The communications system of claim 1, wherein said lightweight protocol provides for the transmission of arbitrary MIME content, but recognizes SOAP as a default protocol for said first sub-layer.

3. The communications system of claim 1, wherein said lightweight protocol is built on the semantics of synchronous request-reply messaging.

4. The communications system of claim 1, wherein said lightweight protocol provides for the establishment of a session by utilizing a TCP 3-way handshake.

5. The communications system of claim 1, wherein said lightweight protocol provides for the closure of said session if either of the following events occurs: an initiator peer closes said session, or an idle session timeout occurs.

6. The communications system of claim 5, wherein an elapsed time associated with said idle session timeout is reset by a listener peer each time a request message is received from an initiator peer.

7. The communications system of claim 1, wherein said lightweight protocol provides for the closure of a session by utilizing a TCP 4-way handshake.

8. The communications system of claim 1, wherein said system is used to transmit at least one of the following types of information between said vehicle communications device and said remote entity: navigation information, infotainment information, and diagnostic information.

9. A method for communicating with a vehicle communications device over a wireless network, comprising the steps of:
 (a) establishing a session between an initiator peer and a listener peer, wherein said session is established over a wireless network configured with a TCP/IP protocol stack having an application layer that includes a first sub-layer utilizing a SOAP protocol, a second sub-layer utilizing a MIME protocol, and a third sub-layer utilizing a non-HTTP lightweight protocol, wherein said non-HTTP lightweight protocol reduces overhead by establishing SOAP as the default protocol for said first sub-layer and establishing MIME as the default protocol for said second sub-layer so that certain control data that would otherwise be required to establish the SOAP and MIME protocols can be omitted from one or more entity-headers;
 (b) sending a request message from said initiator peer to said listener peer;
 (c) sending a response message from said listener peer to said initiator peer; and
 (d) closing said session.

10. The method of claim 9, wherein step (a) further includes utilizing a TCP 3-way handshake to establish said session.

11. The method of claim 9, wherein said method further includes maintaining said session in an open status so that a plurality of said request and response messages can be transmitted without closing said session down.

12. The method of claim 11, wherein step (d) further includes closing said session down if either of the following events occurs: said initiator peer closes said session, or an idle session timeout occurs.

13. The method of claim 12, wherein step (d) further includes resetting an elapsed time associated with said idle session timeout each time said listener peer receives said request message from said initiator peer.

14. The method of claim 9, wherein step (d) further includes utilizing a TCP 4-way handshake to close said session.

15. The method of claim 9, wherein said method is used to transmit at least one of the following types of information over the wireless network: navigation information, infotainment information, and diagnostic information.

16. A communications system for providing wireless communication between a vehicle and one or more remote entities, comprising:
 a vehicle communications device located on the vehicle;
 a remote entity located some distance from the vehicle; and
 a wireless carrier system that communicates with both said vehicle communications device and said remote entity so that information can be wirelessly exchanged therebetween;
 said vehicle communications device, said remote entity, and said wireless carrier system communicate over a network configured with a TCP/IP protocol stack having a data link layer utilizing a CDMA protocol, a network layer utilizing an IP protocol, a transport layer utilizing a TCP protocol, and an application layer, said application layer includes a first sub-layer utilizing a SOAP protocol, a second sub-layer utilizing a MIME protocol, and a third sub-layer utilizing a lightweight protocol,
 wherein said lightweight protocol provides for messages, comprising: a header element containing a size indicator; a trailer element indicating the end of the message; and a payload element located between said header and trailer elements, said payload element is optimized for SOAP content as a default content type so that certain control data that would otherwise be required for SOAP content can be omitted from one or more entity-headers, but can provide for other arbitrary, non-SOAP MIME content by including such control data in one or more entity-headers.

17. The communications system of claim 16, wherein said lightweight protocol provides for extension points that allow directives to be added to or deleted from a protocol specification.

* * * * *